United States Patent [19]
Baker et al.

[11] Patent Number: 5,149,916
[45] Date of Patent: Sep. 22, 1992

[54] TERMINATION OF MINERAL INSULATED ELECTRIC CABLE

[75] Inventors: Harry Baker, Knutsford; Alan Postill, Stockport, both of England

[73] Assignee: Bicc plc, England

[21] Appl. No.: 698,653

[22] Filed: May 10, 1991

[30] Foreign Application Priority Data

May 11, 1990 [GB] United Kingdom ............... 9010559

[51] Int. Cl.[5] .......................................... H02G 15/02
[52] U.S. Cl. ............................. 174/74 R; 174/74 A; 174/76; 174/93
[58] Field of Search .................. 174/74 R, 74 A, 76, 174/93

[56] References Cited

U.S. PATENT DOCUMENTS

| | | | |
|---|---|---|---|
| 3,978,188 | 8/1976 | Schoenebeck | 174/DIG. 8 X |
| 4,287,386 | 9/1981 | Scahill et al. | 174/76 |
| 4,343,844 | 8/1982 | Thayer et al. | 174/74 A X |
| 4,723,054 | 2/1988 | Billet | 174/74 R |
| 4,751,350 | 6/1988 | Eaton | 174/87 |
| 4,877,943 | 10/1989 | Oiwa | 174/74 A X |
| 4,963,698 | 10/1990 | Chang et al. | 174/74 A X |

*Primary Examiner*—Morris H. Nimmo
*Attorney, Agent, or Firm*—Anthony J. Casella; Gerald E. Hespos

[57] ABSTRACT

The rubber sealing cap of a mineral insulated cable termination has embedded in the circumferential wall of the cap effecting a circumferentially continuous, fluid-tight fit around the cut-back sheath of the cable, a resilient metal sleeve which protrudes from the end face of the tube and which has at its free end an inwardly extending flange which mechanically engages with the cable sheath and which is so inclined with respect to the cable sheath as to restrain the cap against removal from the cable. The protruding flange preferably has at its free end a plurality of circumferentially spaced teeth which engage with the cable sheath.

17 Claims, 1 Drawing Sheet

TERMINATION OF MINERAL INSULATED ELECTRIC CABLE

BACKGROUND OF THE INVENTION

This invention relates to the termination of mineral insulated electric cables, that is to say cables of the kind comprising at least one conductor insulated from a surrounding metal sheath, and where there is more than one conductor from the other conductor or conductors, by compacted mineral insulating powder, usually but not necessarily magnesium oxide.

Compacted mineral insulating powder is particularly vulnerable to water penetration and it is the general practice to protect an end of a mineral insulated cable against the ingress of moisture by a metal sealing pot which is screwed or otherwise secured to the cable sheath and which is filled with waterproof sealing compound. Assembly of a sealing pot on an end of a mineral insulated electric cable in such a way as to provide an effective waterproof termination requires a degree of skill and the time taken to terminate mineral insulated electric cables of a mineral insulated electric cable installation contributes to a substantial proportion of the overall cost of the installation.

It has been proposed to provide a mineral insulated cable termination of a kind which can be readily assembled by semi-skilled or unskilled personnel. In one mineral insulated cable termination of this kind, the cut-back end of the cable is sealed by a preformed cap of electrically insulating material comprising a tube which over a part of its length extending from one of its ends effects a circumferentially continuous, substantially fluid-tight fit around the cable sheath and which at the other of its ends has an end wall integral with the tube and spaced from the end face of the cable, the end wall of the cap having a throughbore or throughbores through which the cable conductor or conductors passes or pass and the space within the cap between the end face of the cable and the end wall being filled with waterproof electrically insulating compound. With a view to reducing the risk that the cap can be inadvertently removed from the end of the cable, it has been proposed to employ in a termination of this kind a supplementary device which mechanically secures the cap to the cable sheath. This supplementary device may take the form of a collar of metal or metal alloy surrounding the cap which is radially inwardly distorted to clamp the cap to the cable sheath or which, over a part of its length, effects direct mechanical engagement with the cable sheath.

It is an object of the present invention to provide an improved form of mineral insulated cable termination which can be readily assembled and mechanically secured to the cable sheath by semi-skilled or unskilled personnel.

SUMMARY OF THE INVENTION

According to the invention, in the improved mineral insulated cable termination, a cut-back end of the cable is sealed by a preformed cap of electrically insulating material comprising a tube which over a part of its length extending from one of its ends effects a circumferentially continuous, substantially fluid-tight fit around the cable sheath and which at the other of its ends has an end wall integral with the lube and spaced from the end face of the cable and, tightly embedded in and protruding from the circumferential wall of said part of the length of the tube a device of metal or metal alloy whose protruding part so mechanically engages with and secures the cap to the cable sheath as to restrain the cap against removal from the cable, the end wall of the cap having a throughbore or throughbores through which the cable conductor or conductors passes or pass and the space within the cap between the end face of the cable and said end wall being filled with waterproof electrically insulating material.

With a view to ensuring that the restraining device is so tightly embedded in the circumferential wall of the tube that separation of one from the other is extremely difficult, preferably the embedded part of the device is circumferentially corrugated or is otherwise distorted so that the embedded part of the device is keyed in the circumferential wall of the tube and/or the embedded part of the device is firmly bonded to the circumferential wall of the tube by an adhesive.

The protruding part of the restraining device preferably has at its extreme end a plurality of circumferentially spaced teeth Which extend inwardly towards and mechanically engage with and are so inclined with respect to the cable sheath as to restrain the cap against removal from the cable. In a preferred embodiment, the restraining device comprises a sleeve of resilient metal or metal alloy having at one end of the sleeve an inwardly extending flange having a plurality of circumferentially spaced teeth around its free edge.

The protruding part of the restraining device may be disposed intermediate of the ends of that part of the length of tube fitting around the cable sheath and, in this case, may be partially housed in a circumferential groove in the internal surface of the circumferential wall of said part of the tube. Alternatively, the part of the restraining device mechanically engaging with and securing the cap to the cable sheath may protrude from the end face of the circumferential wall of that part of the length of the tube fitting around the cable sheath and, in this latter case, may be partially disposed in a recess in said end face of the tube.

Preferably, the tube effects a substantially fluid-tight resilient grip around the cable sheath and, in this case, the internal surface of that part of the circumferential wall of the tube embracing the cable sheath may be serrated, knurled or otherwise roughened.

The end wall of the tube preferably has integral with and extending lengthwise outwardly from its outer face a flexible sleeve or two or more flexible sleeves which is or are in axial alignment with the throughbore or throughbores in the end wall and through which the or each cable conductor passes. The internal surface of the or each flexible sleeve may be serrated, knurled or otherwise roughened and effects a circumferentially continuous, substantially fluid-tight resilient grip around the or a cable conductor passing therethrough.

Where the internal surface of the tube and the internal surface of the or each flexible sleeve is serrated, knurled or otherwise roughened, each internal surface has a multiplicity of discrete areas in tight contact with the cable sheath or conductor, as the case may be, resiliently gripped by the tube or flexible sleeve.

An suitable waterproof electrically insulating sealing compound may be used to fill the space within the cap between the end face of the cable and the end wall of the cap. In some circumstances, the sealing compound may be a hardened adhesive such as a thermoset resin; in other circumstances it may be a grease. When the termination is required to pass the same tests with regard to its resistance to fire as the mineral insulated cable to which it is secured, preferably the sealing compound comprises a carrier liquid containing a filler, an anti-oxidant and a copper inhibitor.

Within the cap between the end face of the cable and the end wall of the cap may be housed a button of ceramic or vitreous material which has a throughbore or throughbores in axial alignment with the throughbore or throughbore in the end wall for maintaining conductor separation when there is more than one conductor. Preferably, the button of ceramic or vitreous electrically insulating material and/or the tube has means for positively preventing movement of the button with respect to the tube in a direction away from the end wall of the tube. In one preferred embodiment, the internal surface of the circumferential wall of the tube near the end wall of the tube has a peripherally continuous groove in which the button fits and in which it may be permanently secured by an appropriate cement. In a second preferred embodiment, the insulating material of the tube of the preformed cap is partially moulded around the button in such a way as to prevent movement of the button with respect to the tube.

To facilitate the introduction of the or each conductor of a mineral insulated cable into the or a throughbore of the button, preferably over at least a part of the length of the or each throughbore remote from the end wall of the tube, the internal diameter of the throughbore increases smoothly in a direction away from the end wall to form, in effect, a throat into which a conductor can be readily guided.

The tube and/or the button of ceramic or vitreous electrically insulating material may have means for limiting the extent to which the tube is fitted over the out-back sheath of the cable. Between the button and the end of the tube remote from the end wall, the circumferential wall of the tube may have an inwardly extending circumferentially continuous shoulder against which the end face of the cut-back sheath of the mineral insulated cable abuts or the end face of the button remote from the end wall of the tube may have integral with and upstanding from the end face at least one projection against which the end face of the cable abuts when the cable is introduced into the tube to limit the extent to which the tube can be fitted over the end of the cable.

The end face of the button remote from the end wall may be recessed to provide a reservoir for sealing compound.

The button may have integral with and upstanding lengthwise and outwardly from the button a rigid sleeve or two or more rigid sleeves which is or each of which is a tight fit in the or a throughbore in the end wall of the cap. The or each rigid sleeve upstanding lengthwise and outwardly from the button may protrude from the or a throughbore in the end wall of the cap and into the bore of the flexible sleeve associated with said throughbore, which flexible sleeve has a stepped bore and, in addition to effecting a circumferentially continuous, substantially fluid-tight resilient grip around the or a conductor passing therethrough, also effects a circumferentially continuous, substantially fluid-tight grip around said protruding part of the rigid sleeve of the button.

The cap preferably is made of moulded rubber or rubber-like material or of moulded resilient plastics material.

Intermediate of the ends of the tube of the preformed cap, the tube may be surrounded by at least one collar of metal or metal alloy which is for decorative and/or identification purposes and which may be disposed in a circumferential groove in the external circumferential surface of the tube. The metal collar may carry identification insignia of the manufacturer and/or rating and/or catalogue number of the preformed cap.

The invention also includes, for use in an improved mineral insulated cable termination as hereinbefore described, a preformed cap of electrically insulating material comprising a tube which is open at one of its ends and over a part of its length extending from said open end is adapted to effect a circumferentially continuous, substantially fluid-tight fit around the cut-back sheath of a mineral insulated cable and which has at its other end an end wall having a throughbore or throughbores through which the cable conductor or conductors can pass, wherein the circumferential wall of said part of the length of the tube has embedded therein and protruding therefrom a device of metal or metal alloy whose protruding part is adapted to engage mechanically with and secure the cap to the cable sheath in such a way as to restrain the cap against removal from the cable.

The preformed cap may be at least partially pre-filled with waterproof electrically insulating compound of a grease-like nature.

The preformed cap of the present invention may include any one or more than one of the optional features of the improved mineral insulated cable termination hereinbefore described.

BRIEF DESCRIPTION OF THE DRAWINGS

The invention is further illustrated by a description, by way of example, of two preferred forms of preformed cap for use in an improved mineral insulated cable termination with reference to the accompanying drawing, in which.

DETAILED DESCRIPTION OF THE PREFERRED EMBODIMENT

Figure 1:
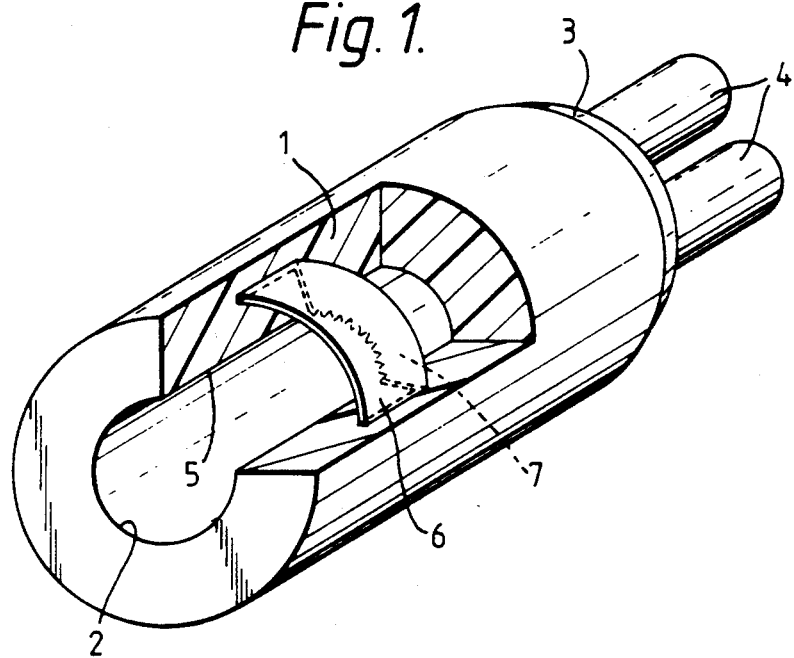
FIG. 1 is a fragmental perspective view of the first preferred form of preformed cap.

The first preferred form of preformed cap shown in FIG. 1 comprises a rubber tube 1 which is open at one end 2 and which at its other end has an end wall 3 having two throughbores through which the exposed conductors of a cut-back mineral insulated electric cable can pass. Two flexible sleeves 4 are integral with and extend outwardly lengthwise from the outer face of the end wall 3 in axial alignment with the throughbores in the end wall. Over a part 5 of the length of the tube 1 extending from the open end 2, the tube is adapted to effect a circumferentially continuous, fluid-tight fit around the cut-back sheath of a mineral insulated electric cable. Embedded in the circumferential wall of the part 5 of the tube 1 is a sleeve 6 of resilient metal having at one end of the sleeve an inwardly extending flange 7 having a plurality of circumferentially spaced teeth around its free edge. The flange 7 is so inclined with respect to the axis of the tube 1 that, when the first preferred form of preformed cap is applied to the cut-back sheath of a mineral insulated cable so that the conductors of the cable extend through the throughbores in the end wall 3 and through the flexible sleeves 4, the circumferentially spaced teeth of the protruding flange will mechanically engage with and secure the cap to the cable sheath and will restrain the cap against removal from the cable.

Figure 2:
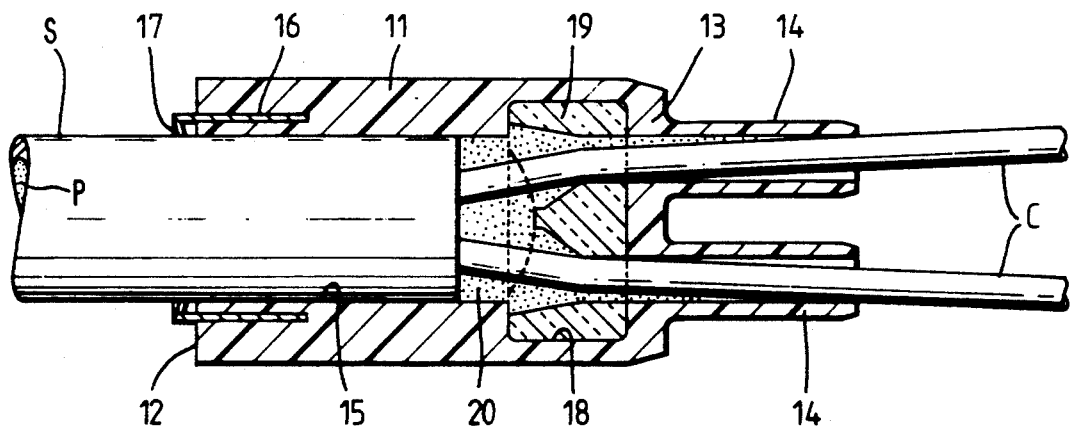
FIG. 2 is a sectional side view of an improved mineral insulated cable termination using the second preferred form of preformed cap.

In the mineral insulated cable termination shown in FIG. 2, the second preferred form of preformed cap is secured to the cut-back sheath a cable comprising two conductors C each insulated from a surrounding metal sheath S and from the other conductor by compacted mineral insulating powder P which fills the spaces between the conductors C and the sheath S. The second preferred form of preformed cap comprises a rubber tube 11 which is open at one end 12 and which at its other end has an end wall 13 having two throughbores through which the conductors C of the cable pass. Two flexible sleeves 14 are integral with and extend outwardly lengthwise from the outer face of the end wall 13 in axial alignment with the throughbores in the end wall so that the conductors C of the cable also pass through the flexible sleeves. Over a part 15 of the length of the tube 11 extending from the open end 12, the tube effects a circumferentially continuous, fluid-tight fit around the cut-back sheath S of the cable. A button 19 of ceramic electrically insulating material having throughbores in axial alignment with the throughbores in the end wall 13 is disposed in a circumferentially continuous groove 18 in the inner surface of the tube 11 and abuts the inner face of the end wall. The space within the cap between the end face of the cable and the end wall 13 is filled with waterproof electrically insulating material 20. Embedded in the circumferential wall of the part 15 of the tube 11 is a sleeve 16 of resilient metal which protrudes from the end face of the circumferential wall of the part 15 of the tube and which has at its free end an inwardly extending flange 17. The flange 17 has a plurality of circumferentially spaced teeth around its free edge mechanically engaging the sheath S and is so inclined with respect to the sheath as to restrain the cap against removal from the cable.

What we claim as our invention is:

1. A termination of a mineral insulated electric cable comprising at least one conductor, a metal sheath surrounding and radially spaced from the conductor, and compacted mineral insulating powder electrically insulating the conductor from and filling the space between the conductor and, the metal sheath, in which termination a cut-back end of the cable is sealed by a preformed cap of electrically insulating material comprising a tube which over a part of its length extending from one of its ends effects a circumferentially continuous, substantially fluid-tight fit around the cable sheath and which at the other of its ends has an end wall integral with the tube and spaced from the end face of the cable and, tightly embedded in an protruding from the circumferential wall of said part of the length of the tube a device of metal or metal alloy whose protruding part mechanically engages with and secures the cap to the cable sheath and restrains the cap against removal from the cable, the end wall of the cap having at least one throughbore through which the cable conductor passes and the space within the cap between the end face of the cable and said end wall being filled with waterproof electrically insulating material.

2. A mineral insulated cable termination as claimed in claim 1, wherein the embedded part of the restraining device is so distorted that the embedded part of the device is keyed in the circumferential wall of the tube.

3. A mineral insulated cable termination as claimed in claim 1, wherein the embedded part of the restraining device is firmly bonded to the circumferential wall of the tube by a adhesive.

4. A mineral insulated cable termination as claimed in claim 1, wherein the protruding part of the restraining device has at its extreme end a plurality of circumferentially spaced teeth which extend inwardly towards and mechanically engage with and are so inclined with respect to the cable sheath as to restrain the cap against removal from the cable.

5. A mineral insulated cable termination as claimed in claim 4, wherein the restraining device comprises a sleeve of resilient metal or metal alloy having at one end of the sleeve an inwardly extending flange having a plurality of circumferentially spaced teeth around its free edge.

6. A mineral insulated cable termination as claimed in claim 1, wherein the protruding part of the restraining device is disposed intermediate of the ends of that part of the length of the tube fitting around the cable sheath.

7. A mineral insulated cable termination as claimed in claim 6, wherein the restraining device is partially housed in a circumferential groove in the internal surface of the circumferential wall of that part of the length of tube fitting around the cable sheath.

8. A mineral insulated cable termination as claimed in claim 1, wherein the part of the restraining device mechanically engaging with and securing the cap to the cable sheath protrudes from the end face of circumferential wall of that part of the length of the tube fitting around the cable sheath.

9. A mineral insulated cable termination as claimed in claim 1, wherein the tube effects a substantially fluid-tight resilient grip around the cable sheath.

10. A preformed cap of electrically insulating material for terminating a mineral insulated electric cable, said cable comprising at least one conductor, a metal sheath surrounding and radially spaced from the conductor and compacted mineral insulating powder electrically insulating the conductor from, and filling the space between the conductor, and the metal sheath, which cap comprises a tube which is open at one of its ends and over a part of its length extending from said open end is adapted to effect a circumferentially continuous, substantially fluid-tight fit around the cut-back sheath of a mineral insulated cable and which has at its other end and end wall having at least one throughbore through which a cable conductor can pass, wherein the circumferential wall of said part of the length of the tube has embedded therein a device of metal or metal alloy of which a part protrudes from the circumferential wall and, when the cap effects a fluid-tight fit around the cut-back sheath of an installed cable will engage mechanically with and secure the cap to the cable sheath and so restrain the cap against removal from the installed.

11. A preformed cap as claimed in claim 10, wherein the embedded part of the restraining device is firmly bonded to the circumferential wall of the tube by an adhesive.

12. A preformed cap as claimed in claim 10, wherein the protruding part of the restraining device has at its extreme end a plurality of circumferentially spaced teeth which extend inwardly towards the axis of the tube and are so inclined as to restrain the cap against removal from a mineral insulated cable when the cap is fitted therearound.

13. A preformed cap as claimed in claim 12, wherein the restraining device comprises a sleeve of resilient metal or metal alloy having at one end of the sleeve an inwardly extending flange having a plurality of circumferentially spaced teeth around its free edge.

14. A preformed cap as claimed in claim 10, wherein the protruding par of the restraining device is disposed intermediate of the ends of that part of the length of the tube adapted to fit around the cut-back sheath of a mineral insulated cable.

15. A preformed cap as claimed in claim 10, wherein the part of the restraining device adapted to mechanically engage with and secure the cap to the cut-back sheath of a mineral insulated cable protrudes from the end face of the circumferential wall of that part of the length of the tube adapted to fit around the cut-back sheath of a cable.

16. A preformed cap as claimed in claim 10, wherein the cap is at least partially pre-filled with a waterproof electrically insulating compound of a grease-like nature.

17. A preformed cap as claimed in claim 10, wherein the cap is made of moulded rubber or rubber-like material.

* * * * *